United States Patent
Shea et al.

(10) Patent No.: US 7,633,399 B2
(45) Date of Patent: Dec. 15, 2009

(54) CONFIGURABLE ARC FAULT OR GROUND FAULT CIRCUIT INTERRUPTER AND METHOD

(75) Inventors: John Joseph Shea, Pittsburgh, PA (US); Kevin Lynn Parker, Pittsburgh, PA (US)

(73) Assignee: Eaton Corporation, Cleveland, OH (US)

( * ) Notice: Subject to any disclaimer, the term of this patent is extended or adjusted under 35 U.S.C. 154(b) by 337 days.

(21) Appl. No.: 11/679,570

(22) Filed: Feb. 27, 2007

(65) Prior Publication Data

US 2008/0204947 A1 Aug. 28, 2008

(51) Int. Cl.
- G08B 21/00 (2006.01)
- H02H 3/00 (2006.01)
- H02H 9/08 (2006.01)

(52) U.S. Cl. ............... 340/635; 340/649; 340/650; 361/42

(58) Field of Classification Search ............. 340/635, 340/649–651; 324/424, 509; 361/42–50; 345/117, 907

See application file for complete search history.

(56) References Cited

U.S. PATENT DOCUMENTS

| | | | |
|---|---|---|---|
| 1,801,173 A | 4/1931 | Petersen |
| 2,898,427 A | 8/1959 | Nadeau |
| 3,469,215 A | 9/1969 | Brovedan |
| 3,525,961 A | 8/1970 | Marien |
| 3,727,157 A | 4/1973 | Grunert et al. |
| 3,805,096 A | 4/1974 | Hamilton, II |
| 3,941,989 A | 3/1976 | McLaughlin et al. |
| 3,999,176 A | 12/1976 | Kellogg et al. |
| 4,023,885 A | 5/1977 | Snowden et al. |
| 4,081,852 A | 3/1978 | Coley et al. |
| 4,087,770 A | 5/1978 | Kuhn et al. |
| 4,307,389 A | 12/1981 | Slotkowski |
| 4,331,997 A | 5/1982 | Engel et al. |
| 4,351,013 A | 9/1982 | Matsko et al. |
| 4,401,863 A | 8/1983 | Lemmer et al. |
| 4,409,665 A | 10/1983 | Tubbs |
| 4,476,423 A | 10/1984 | Mallick, Jr. et al. |
| 4,525,694 A | 6/1985 | Dennison et al. |
| 4,544,814 A | 10/1985 | Butterworth et al. |
| 4,568,805 A | 2/1986 | Wycklendt |
| 4,595,894 A | 6/1986 | Doyle et al. |
| 4,618,748 A | 10/1986 | Mueller |
| 4,653,073 A | 3/1987 | Vercellotti et al. |
| 4,685,024 A | 8/1987 | Martellock et al. |
| 4,713,718 A | 12/1987 | Quayle |

(Continued)

OTHER PUBLICATIONS

Installation/Configuration Instructions for 42GNP-9000 Diffuse Photoelectric Sensor for DeviceNetTM, Publication PA-9412(A), Allen-Bradley, Jul. 1994, 2 pp.

(Continued)

*Primary Examiner*—Jennifer Mehmood
(74) *Attorney, Agent, or Firm*—Martin J. Moran

(57) ABSTRACT

An arc fault and/or ground fault circuit interrupter includes an operating mechanism structured to open and close separable contacts, a trip mechanism cooperating with the operating mechanism to trip open the separable contacts, a test button structured to test the operating mechanism, an indicator, and a controller structured to configure a setting of the circuit interrupter and operate the indicator to indicate the setting in response to an actuation of the test button.

4 Claims, 4 Drawing Sheets

U.S. PATENT DOCUMENTS

| | | | |
|---|---|---|---|
| 4,736,157 A | 4/1988 | Betker et al. | |
| 4,747,061 A | 5/1988 | Lagree et al. | |
| 4,752,853 A | 6/1988 | Matsko et al. | |
| 4,760,364 A | 7/1988 | Ostby | |
| 4,766,273 A | 8/1988 | Butterworth et al. | |
| 4,823,225 A | 4/1989 | Foster et al. | |
| 4,825,143 A | 4/1989 | Cheng | |
| 4,827,369 A | 5/1989 | Saletta et al. | |
| 4,851,951 A | 7/1989 | Foster, Jr. | |
| 4,866,557 A | 9/1989 | Fitts et al. | |
| 4,870,531 A | 9/1989 | Danek | |
| 4,937,757 A | 6/1990 | Dougherty | |
| 4,963,846 A | 10/1990 | Grunert et al. | |
| 4,983,955 A | 1/1991 | Ham, Jr. et al. | |
| 4,991,042 A * | 2/1991 | Tokarski et al. | 361/93.2 |
| 5,007,013 A | 4/1991 | Elms | |
| 5,051,861 A * | 9/1991 | Purkayastha et al. | 361/96 |
| 5,214,559 A | 5/1993 | Zerbian et al. | |
| 5,224,006 A | 6/1993 | MacKenzie et al. | |
| 5,224,011 A | 6/1993 | Yalla et al. | |
| 5,260,676 A | 11/1993 | Patel et al. | |
| 5,293,522 A | 3/1994 | Fello et al. | |
| 5,307,230 A | 4/1994 | MacKenzie | |
| 5,459,630 A | 10/1995 | MacKenzie et al. | |
| 5,467,002 A | 11/1995 | Brooks | |
| 5,490,086 A * | 2/1996 | Leone et al. | 700/292 |
| 5,519,561 A | 5/1996 | Mrenna et al. | |
| 5,524,083 A | 6/1996 | Horne et al. | |
| 5,546,226 A | 8/1996 | Herington | |
| 5,691,869 A | 11/1997 | Engel et al. | |
| 5,699,222 A | 12/1997 | Innes | |
| 5,831,503 A | 11/1998 | Beck et al. | |
| 5,889,643 A | 3/1999 | Elms | |
| 5,926,355 A | 7/1999 | Matsko et al. | |
| 5,961,871 A | 10/1999 | Bible et al. | |
| 5,982,593 A | 11/1999 | Kimblin et al. | |
| 6,040,967 A | 3/2000 | DiSalvo | |
| 6,055,145 A * | 4/2000 | Lagree et al. | 361/93.1 |
| 6,215,378 B1 | 4/2001 | Gibson et al. | |
| 6,246,558 B1 | 6/2001 | DiSalvo et al. | |
| 6,282,070 B1 | 8/2001 | Ziegler et al. | |
| 6,285,534 B1 | 9/2001 | Gibson et al. | |
| 6,288,882 B1 | 9/2001 | DiSalvo et al. | |
| 6,309,248 B1 | 10/2001 | King | |
| 6,370,001 B1 * | 4/2002 | Macbeth | 361/170 |
| 6,381,112 B1 | 4/2002 | DiSalvo | |
| 6,392,513 B1 | 5/2002 | Whipple et al. | |
| 6,417,671 B1 | 7/2002 | Tiemann | |
| 6,426,632 B1 * | 7/2002 | Clunn | 324/509 |
| 6,552,549 B1 | 4/2003 | Kaiser et al. | |
| 6,593,751 B2 | 7/2003 | Takahashi | |
| 6,720,872 B1 | 4/2004 | Engel et al. | |
| 2004/0174173 A1 * | 9/2004 | Elms et al. | 324/509 |
| 2006/0218531 A1 | 9/2006 | Parker | |
| 2008/0007879 A1 * | 1/2008 | Zaretsky et al. | 361/42 |

OTHER PUBLICATIONS

"Modeling Overcurrent Relay Characteristics", by S. Chan, R. Mauer; Computer Applications in Power, vol. 5, No. 1; pp. 41-45, Jan. 1992.

Development and Application of Electronic Circuit Protection', by William E. May, P.E., and Monhar K. Patel; Conference Record of the 1987 IEEE Industry Applications Society Annual Meeting (87CH2499-2) pp. 1352-1357, Oct. 18-23, 1987.

Underwriters Laboratories Inc. (UL), "UL Standard for Safety for Arc-Fault Circuit-Interrupters", UL 1699, Feb. 26, 1999, 83 pp.

Underwriters Laboratories Inc. (UL, UL Standard for Safety for Ground-Fault Circuit-Interrupters', UL 943, Aug. 27, 1993, 87 pp.

Manzoul, M. A., "Interrupt-Driven Microprocessor Based Overcurrent Relay", IEEE Transactions on Industrial Electronics, vol. 38, No. 1, pp. 8-9, Feb. 1991.

Mendis, S. et al., "Rule-Based Coordination Program Evaluates Distribution Transformer Overcurrent Protection Alternatives", IEEE Computer Applications in Power, pp. 31-36, Apr. 1991.

Chan, S. et al., "Modeling Overcurrent Relay Characteristics", IEEE Computer Applications in Power, vol. 5, No. 1, pp. 41-45, Jan. 1992.

* cited by examiner

CONFIGURABLE ARC FAULT OR GROUND FAULT CIRCUIT INTERRUPTER AND METHOD

BACKGROUND OF THE INVENTION

1. Field of the Invention

This invention pertains generally to circuit interrupters and, more particularly, to arc fault and/or ground fault circuit interrupters providing a cost-effective user interface to selectively enable forms of protection and/or configure protection settings. The invention also relates to methods of cost-effectively enabling forms of protection and/or configuring protection settings of circuit interrupters.

2. Background Information

Circuit breakers are used to protect electrical circuitry from damage due to an overcurrent condition, such as an overload condition or a relatively high level short circuit or fault condition. In small circuit breakers, commonly referred to as miniature circuit breakers, used for residential and light commercial applications, such protection is typically provided by a thermal-magnetic trip device. This trip device includes a bimetal, which heats and bends in response to a persistent overcurrent condition. The bimetal, in turn, unlatches a spring powered operating mechanism, which opens the separable contacts of the circuit breaker to interrupt current flow in the protected power system.

An arc fault circuit interrupter (AFCI) is a device intended to mitigate the effects of arc faults by functioning to deenergize an electrical circuit when an arc fault is detected. Non-limiting examples of AFCIs include: (1) arc fault circuit breakers; (2) branch/feeder arc fault circuit interrupters, which are intended to be installed at the origin of a branch circuit or feeder, such as a panelboard, and which may provide protection from ground faults and line-to-neutral faults; (3) outlet circuit arc fault circuit interrupters, which are intended to be installed at a branch circuit outlet, such as an outlet box, in order to provide protection of cord sets and power-supply cords connected to it (when provided with receptacle outlets) against the unwanted effects of arcing, and which may provide protection from line-to-ground faults and line-to-neutral faults; (4) cord arc fault circuit interrupters, which are intended to be connected to a receptacle outlet, in order to provide protection to an integral or separate power supply cord; (5) combination arc fault circuit interrupters, which function as either a branch/feeder or an outlet circuit AFCI; and (6) portable arc fault circuit interrupters, which are intended to be connected to a receptacle outlet and provided with one or more outlets.

Arc faults can be series or parallel. Examples of a series arc are a broken wire where the ends of the broken wire are close enough to cause arcing, or a relatively poor electrical connection. Parallel arcs occur between conductors of different potential including, for example, a power conductor and a ground. Arc faults have a relatively high impedance. Thus, a series arc results in a reduction in load current and is not detected by the normal overload and overcurrent protection of conventional protection devices. Even the parallel arc, which can draw current in excess of normal rated current in a circuit, produces currents which can be sporadic enough to yield RMS values less than that required to produce a thermal trip, or at least delay operation. Effects of the arc voltage and line impedance often prevent the parallel arc from reaching current levels sufficient to actuate the instantaneous trip function.

During sporadic arc fault conditions, the overload capability of a conventional circuit breaker will not function since the root-mean-squared (RMS) value of the fault current is too small to activate the automatic trip circuit. The addition of electronic arc fault sensing to a circuit breaker can add one of the elements required for sputtering arc fault protection-ideally, the output of an electronic arc fault sensing circuit directly trips and, thus, opens the circuit breaker. See, for example, U.S. Pat. Nos. 6,710,688; 6,542,056; 6,522,509; 6,522,228; 5,691,869; and 5,224,006, and U.S. Patent Application Publication No. 2005/0017731, all of which are incorporated herein by reference.

In ground fault circuit breakers, for example, an electronic circuit typically detects leakage of current to ground and generates a ground fault trip signal. This trip signal energizes a trip solenoid, which unlatches the operating mechanism, often through deflection of the armature of a thermal-magnetic trip device. Ground fault circuit breakers include both Class A (e.g., ground fault current of about 5 mA for people protection) and equipment protective devices (e.g., ground fault current of about 30 mA; of about 20 to about 100 mA).

AFCI functionality in the field of residential circuit protection is known, but to date, cost considerations have caused the provision of AFCI functionality in residential settings to remain uncommon.

Circuit protection devices are used in commercial settings where a greater degree of operator input in selecting forms of protection and protection settings are commonly provided. Relatively large electrical loads and a host of more stringent safety standards have resulted in costs being less of a factor than in residential settings such that more complex circuit protection devices having more features are commonplace in commercial settings. Adding to the complexity and costs of circuit protection devices employed in commercial settings is the provision of control mechanisms through which GFCI and/or AFCI functions may be selectively enabled and sensitivity levels for such functions may be set.

In more recent years, with the technological progress resulting in ever more uses for electricity, the amount of electrical power required in residential settings has markedly increased. Residential structures now employ greater quantities of electric circuits, and many of these electric circuits are of greater capacity. As a result, it has become ever more desirable to more widely employ GFCI and AFCI functionality in residential settings. However, costs and complexity remain issues that continue to slow the introduction of such functionality into a residential setting.

SUMMARY OF THE INVENTION

These needs and others are met by embodiments of the invention providing a circuit interrupter including an operating mechanism structured to open and close separable contacts, a trip mechanism cooperating with the operating mechanism to trip open the separable contacts, a test button structured to test the operating mechanism, an indicator, and a controller structured to configure a setting of the circuit interrupter and operate the indicator to indicate the setting in response to an actuation of the test button.

In accordance with one aspect of the invention, an arc fault circuit interrupter comprises separable contacts, an operating mechanism structured to open and close the separable contacts, a trip mechanism cooperating with the operating mechanism to trip open the separable contacts, a test button operable to test the trip mechanism, an indicator; and a controller structured to configure a setting of the arc fault circuit interrupter and to operate the indicator to indicate the setting in response to receiving an indication of an actuation of the test button.

In accordance with another aspect of the invention, a ground fault circuit interrupter comprises separable contacts, an operating mechanism structured to open and close the separable contacts, a trip mechanism cooperating with the operating mechanism to trip open the separable contacts, a test button operable to test the trip mechanism, an indicator; and a controller structured to configure a setting of the ground fault circuit interrupter and to operate the indicator to indicate the setting in response to receiving an indication of an actuation of the test button In accordance with another aspect of the invention, a method is for protecting a power circuit with a circuit interrupter having separable contacts, an operating mechanism structured to open and close the separable contacts, a trip mechanism cooperating with the operating mechanism to trip open the separable contacts, a test button to test the trip mechanism, an indicator, and an arc fault detector or a ground fault detector. The method comprises awaiting an actuation of the test button, testing the trip mechanism in response to the duration of the actuation of the test button being within a first preselected range of time duration, and configuring a setting of the circuit interrupter and operating the indicator to indicate the setting in response to the duration of the actuation of the test button being within a different second preselected range of time duration.

In accordance with another aspect of the invention, a method is for protecting a power circuit with a circuit interrupter having separable contacts, an operating mechanism structured to open and close the separable contacts, a trip mechanism cooperating with the operating mechanism to trip open the separable contacts, a test button to test the trip mechanism, an indicator, and an arc fault detector or a ground fault detector. The method comprises awaiting an actuation of the test button, testing the trip mechanism in response to the duration of the actuation of the test button being within a first preselected range of time duration, and selecting a protection mode and operating the indicator to indicate the selection of the protection mode in response to the duration of the actuation of the test button being within a different second preselected range of time duration.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
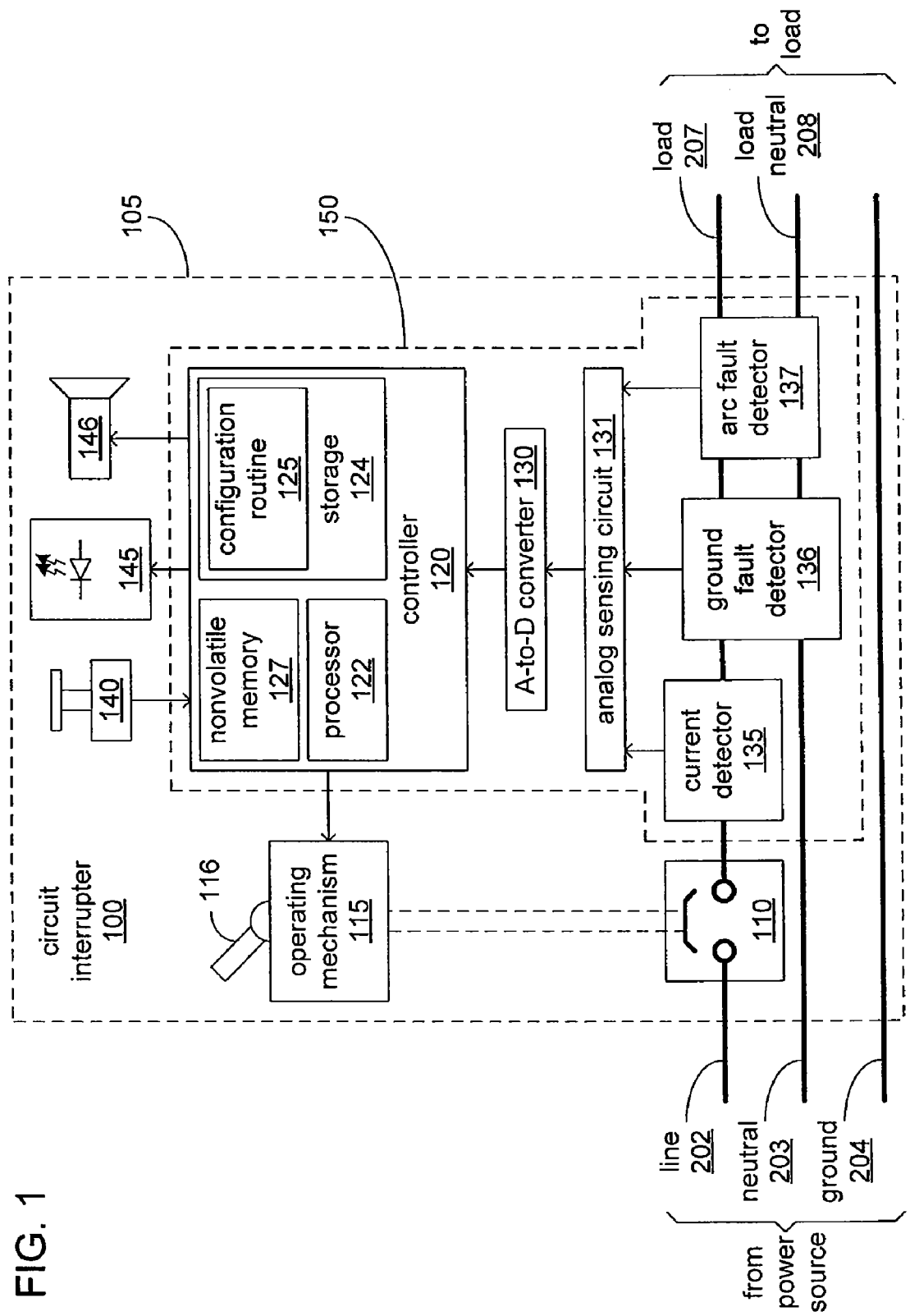
FIG. 1 is a block diagram of a circuit breaker in accordance with embodiments of the invention.

FIG. 1 depicts an embodiment of a configurable circuit interrupter 100 incorporating separable contacts 110, an operating mechanism 115 that may incorporate an operating handle 116, a test button 140, a trip mechanism 150, and one or both of a visual indicator 145 and an audio output device 146. The trip mechanism 150 incorporates a controller 120, an A-to-D converter 130, an analog sensing circuit 131, and one or more of a current detector 135, a ground fault detector 136 and an arc fault detector 137. The controller 120 incorporates a processor 122, a storage 124 with a configuration routine 125 stored therein, and a nonvolatile memory 127.

Electric power from a power source (not shown) is provided to the circuit interrupter 100 through at least a line conductor 202 and a neutral conductor 203, and is delivered to a load (not shown) through at least a load conductor 207 and a load neutral conductor 208, where the circuit interrupter 100 is employed to protect a single-phase circuit. Furthermore, a ground conductor 204 may provide a ground to Earth for safety purposes to both the circuit interrupter 100 and the load. As those skilled in the art will readily recognize, although embodiments discussed herein are largely centered on protecting single-phase circuits, alternate embodiments of the circuit interrupter 100 to protect plural-phase circuits are easily possible. In some embodiments, the circuit interrupter 100 is a residential circuit breaker having a residential circuit interrupter housing 105 and being structured for installation into a typical residential distribution panel (not shown).

The operating mechanism 115 mechanically operates the separable contacts 110 to cause them to open and close, thereby selectively breaking and completing the connection of power from a power source to a load through the circuit interrupter 100. The operating mechanism 115 may be magnetically and/or thermally driven under the control of input received from the trip mechanism 150 in any of a number of possible ways that will be familiar to those skilled in the art. In some embodiments, the operating mechanism further incorporates the operating handle 116, allowing the operating mechanism 115 to be manually operated to cause the separable contacts 110 to be opened or closed. However, although the use of the separable contacts 110 is disclosed, those skilled in the art will readily recognize that other forms of circuit interrupting mechanism may be employed, including and without limitation, a solid state or FET switch, contactor contacts, and a solid state based control/protection device (e.g., without limitation, drives or soft-starters). In using such alternate forms of circuit interrupting mechanism in place of the separable contacts 110, the operating mechanism may electrically (rather than mechanically) operate a given alternate form of circuit interrupting mechanism in response to input received from the trip mechanism 150.

Within the trip mechanism 150, the controller 120 receives inputs from one or more of the current detector 135, the ground fault detector 136 and the arc fault detector 137 through the analog sensing circuit 131 and the A-to-D converter 130. The controller 120 is configured with one or more circuit protection settings through the test button 140 and one or both of the visual indicator 145 and the audio output device 146 in a process that will be explained in greater detail. In a process that will also be explained in greater detail, the controller 120 uses these settings to determine whether or not to operate the operating mechanism 115 to trip open the separable contacts 110 in response to a given input from one or more of the current detector 135, the ground fault detector 136 and the arc fault detector 137.

In embodiments incorporating the current detector 135, the controller 120 receives input from the current detector 135 indicating the amount of current flowing between the power source and the load. More specifically, in the single-phase embodiment depicted in FIG. 1, the current detector 135 provides an indication of the amount of current flowing between the line conductor 202 and the load conductor 207. When the current exceeds a preselected level, and possibly for a preselected period of time, the controller 120 operates the operating mechanism 115 to trip open the separable contacts 110. Preselected levels, preselected periods of time and/or a choice to enable or disable one or more forms of overcurrent protection may be among the configurable settings. By way of example, the controller 120 may permit separate current levels and periods of time to be set for a short time delay and a long time delay. The controller 120 may allow the short time delay and long time delay durations to be set, and/or the controller 120 may allow the current levels that would cause the controller 120 to trip the separable contacts 110 for each of the short and long time delays to be set.

In embodiments incorporating the ground fault detector 136, the controller 120 receives input from the ground fault detector 136 indicating occurrences of the amount of current flowing in the load conductor 207 being different from the amount of current flowing in the load neutral conductor 208 by more than a preselected level. When such an instance occurs, the controller 120 operates the operating mechanism 115 to trip open the separable contacts 110. The preselected level and/or a choice to enable or disable ground fault circuit protection may be among the configurable settings. By way of example, the controller 120 may permit the level of difference in current that would cause the controller 120 to trip open the separable contacts 110, if reached, to be selected from between 5 mA for a human protection mode and 30 mA for an equipment protection mode.

In embodiments incorporating the arc fault detector 137, the controller 120 receives input from the arc fault detector indicating occurrences of either a series arc fault or a parallel arc fault, depending on which of these conditions the arc fault detector 137 is able to detect. Where the arc fault detector 137 is able to detect a series arc fault, the arc fault detector 137 provides an indication to the controller 120 of instances of current flow between the power source and the load consistent with a series arc fault. Where the arc fault detector 137 is able to detect a parallel arc fault, the arc fault detector 137 provides an indication of instances of current flow between the power source and the load consistent with a parallel arc fault. When an arc fault is detected, the controller 120 operates the operating mechanism 115 to trip open the separable contacts 110. A choice to enable or disable one or both of the series and parallel arc fault circuit protections may be among the configurable settings.

Within the controller 120, the processor 122 retrieves and executes sequences of instructions stored in the storage 124 to configure circuit protection settings, to test the operation of the trip mechanism 150 in causing the separable contacts 110 to be tripped open, and to cause the controller 120 to provide circuit protection by causing the separable contacts 110 to be tripped open in response to the various situations just described. The processor 122 may be any of a variety of types of processing device, including, for example, a specialized processor such as a DSP or microcontroller, or a more general function processor such as a processor executing the widely known and used "X86" instruction set. The storage 124 is a machine readable storage device that may be made up of volatile and/or non-volatile forms of storage devices including, but not limited to, RAM, ROM, FLASH, EPROM, and magnetic and/or optical machine readable media, that may or may not be of a removable form.

In configuring circuit protection settings, the processor 122 retrieves and executes a sequence of instructions of the configuration routine 125 within the storage 124 causing the processor 122 to respond to the test button 140 being actuated for a period of time within a preselected range of time by entering into a configuration mode. The requirement that the test button 140 be actuated for a period of time within a preselected range of time allows an actuation of the test button 140 meant to cause the processor 122 to enter the configuration mode to be distinguished from an actuation of the test button 140 meant to cause the processor 122 to test the trip mechanism 150, which requires that the test button 140 be actuated for a period of time within a different preselected range of time. By way of a non-limiting example, an actuation of the test button 140 meant to cause entry into the configuration mode may be of any duration up to 2 seconds, while an actuation of the test button 140 meant to cause a test to occur may be required to be of a duration of greater than 2 seconds. Alternatively, to avoid responding to accidental actuations of the test button 140, an actuation of the test button 140 meant to cause a test may be required to be of a duration of 1 to 2 seconds, while an actuation meant to cause a entry into the configuration mode may be required to be of a duration greater than 2 seconds. Upon entry into the configuration mode, the processor 122 is further caused to respond to further actuations of the test button 140 to select settings to be configured, to configure settings, and/or to select a protection mode from among multiple protection modes where each protection mode defines one or more of setting choices. The settings, when configured, are stored in the nonvolatile memory 127. In some embodiments, the settings may be directly stored in the nonvolatile memory 127, and in other embodiments, the settings may be indirectly stored in the nonvolatile memory 127 in that an indication of a choice of a protection mode that defines one or more setting choices is stored in the nonvolatile memory. Where a protection mode is to be selected, a data structure matching identifiers of various protection modes to various settings may also be stored in the nonvolatile memory 127 and/or in the storage 124.

One or both of the visual indicator 145 and the audio output device 146 are employed to provide indications to a person operating the test button 140 of current settings, settings to be configured, successful configuration of a setting, and/or successful selection of a protection mode. In embodiments employing the visual indicator 145, the visual indicator 145 may be an LED or other light emitting device that is turned on and off for differing time durations and/or at specific moments to provide various indications. Alternatively, the visual indicator 145 may be a plurality of light emitting devices that are turned on and off in different combinations to provide various indications. In another alternative, the visual indicator 145 may be at least one light emitting device capable of emitting light in different colors allowing indications to be provided with color codes. In still another alternative, the visual indicator 145 may be a dot-matrix or alphanumeric display device. In embodiments employing the audio output device 146, the audio output device 146 may be employed to emit one or more tones, perhaps of differing frequencies, to provide indications. Alternatively, the audio output 146 device may be employed to output a synthesized or recorded pronunciation of words to provide indications.

In providing circuit protection, the processor 122 retrieves and executes a sequence of instructions causing the processor to monitor the inputs received from one or more of the current detector 135, the ground fault detector 136 and the arc fault detector 137 to determine whether an electrical event has occurred that warrants causing the processor 122 to operate the operating mechanism 115 to trip open the separable contacts 110. In making this determination, the processor 122 is caused to compare these inputs to any settings specifying limits of time duration, current levels and/or voltage levels, as well as responding to settings indicating which circuit protections have been enabled or disabled such that the processor 122 may ignore one or more inputs in response to one or more circuit protections having been disabled. Where a given form of circuit protection has been disabled, the processor 122 may be caused to employ one or both of the visual indicator 145 and the audio output device 146 to provide an indication that an electrical event that would have warranted tripping open the separable contacts 110 did occur.

The use of the test button 140 along with one or both of the visual indicator 145 and the audio output device 146 provides a cost-effective user interface by which both testing and configuration of the circuit interrupter 100 may be conducted. In this way, the expense of a more complex user interface employing a keyboard, a pointing device, a graphical display presenting menus, or other more costly devices is avoided. This enables the provision of a configurable circuit interrupter that may offer multiple forms of circuit protection to be provided for more cost-restrictive residential installations. Although not depicted in FIG. 1, the circuit interrupter 100 may further include an interface enabling the controller 120 to be linked to a media storage device and/or a network by which the configuration routine 125 may be backed up onto a storage medium, updated (possibly from a storage medium), or otherwise altered, perhaps to permit some degree of customization for a given installation in a residential setting.

Figure 2:
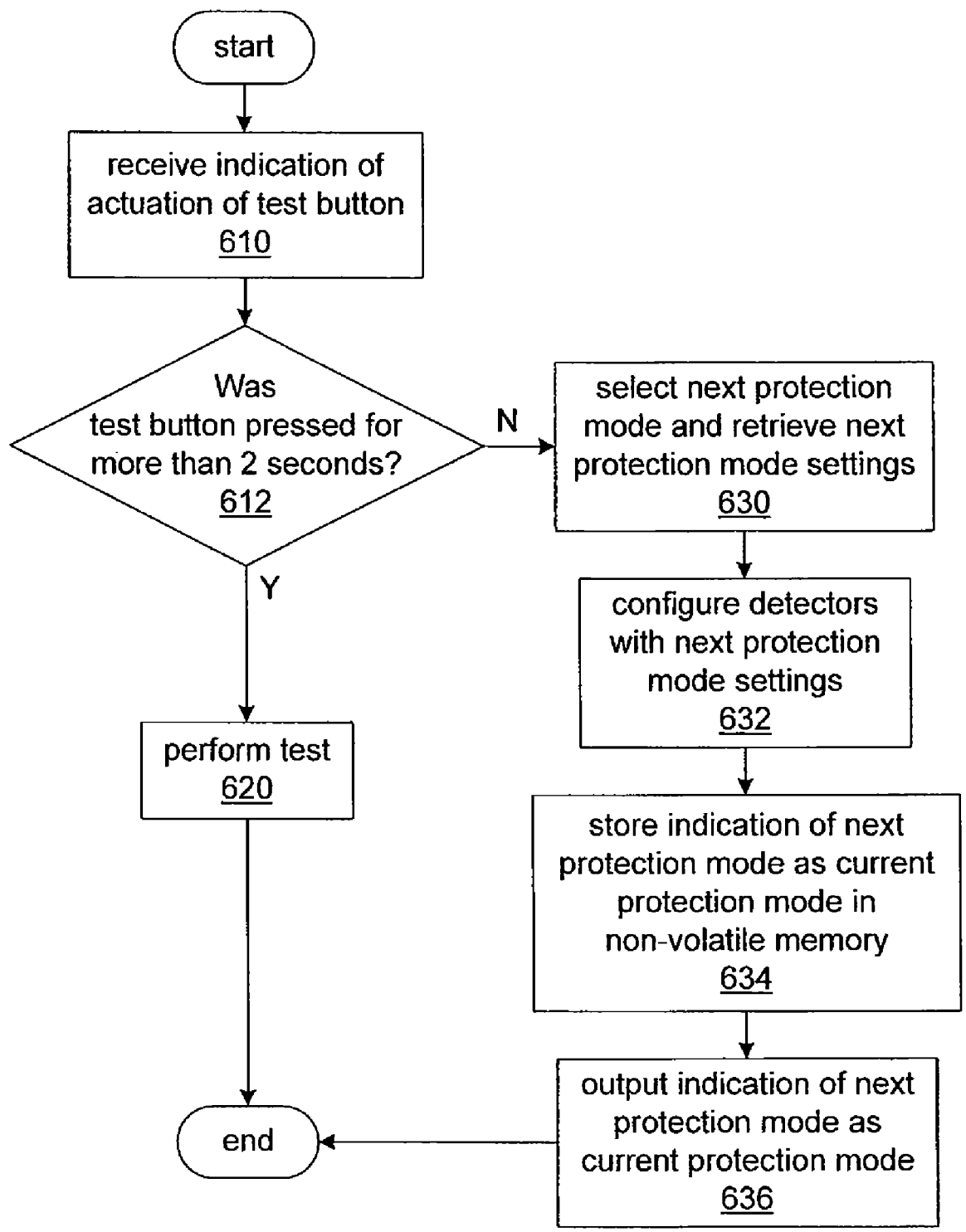
FIG. 2 is a flowchart of configuring a residential circuit protection device in accordance with another embodiment of the invention.

FIG. 2 shows an exemplary procedure for configuring a circuit interrupter in which settings are configured through selecting a protection mode. At 610, an indication that a test button was actuated is received. If, at 612, the test button was pressed for more than 2 seconds, then a test of the trip mechanism of the circuit interrupter is performed at 620. However, if the test button was not pressed for more than 2 seconds, then a configuration mode is entered in which the next protection mode in a succession of protection modes is selected at 630 in place of whatever may be the current protection mode. At 632, the detectors are configured with the new settings defined by the next protection mode selected at 630, and an indication of the selection of the next protection mode is stored in a nonvolatile memory at 634. At 636, an indication of the next protection mode being selected as the new current protection mode is output. As previously discussed, this output of this indication may be accomplished through lighting a light emitting device and/or through producing a tone or other sound.

Figure 3A:
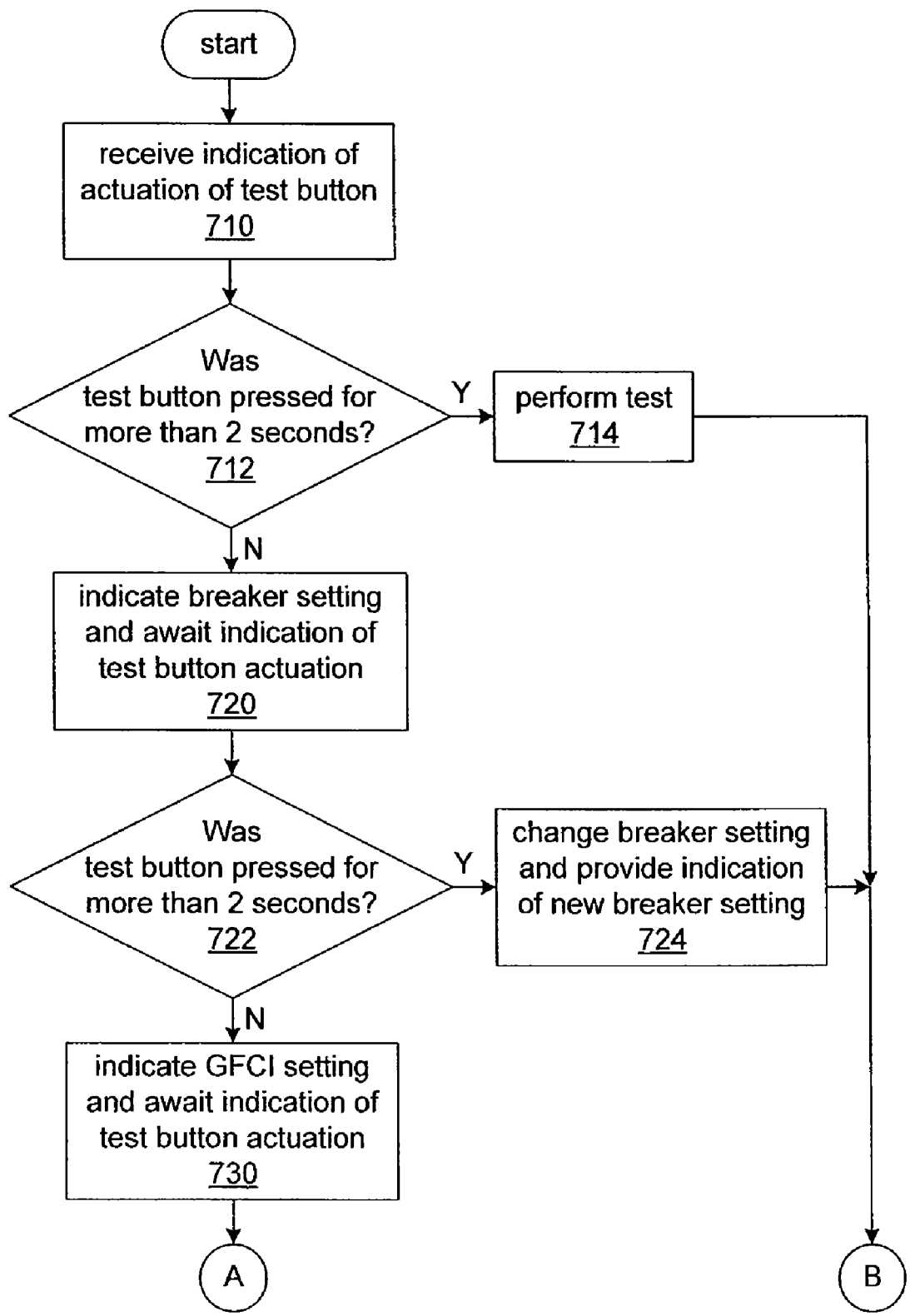
FIGS. 3a and 3b are a flowchart of configuring a residential circuit protection device in accordance with still another embodiment of the invention.
Figure 3B:
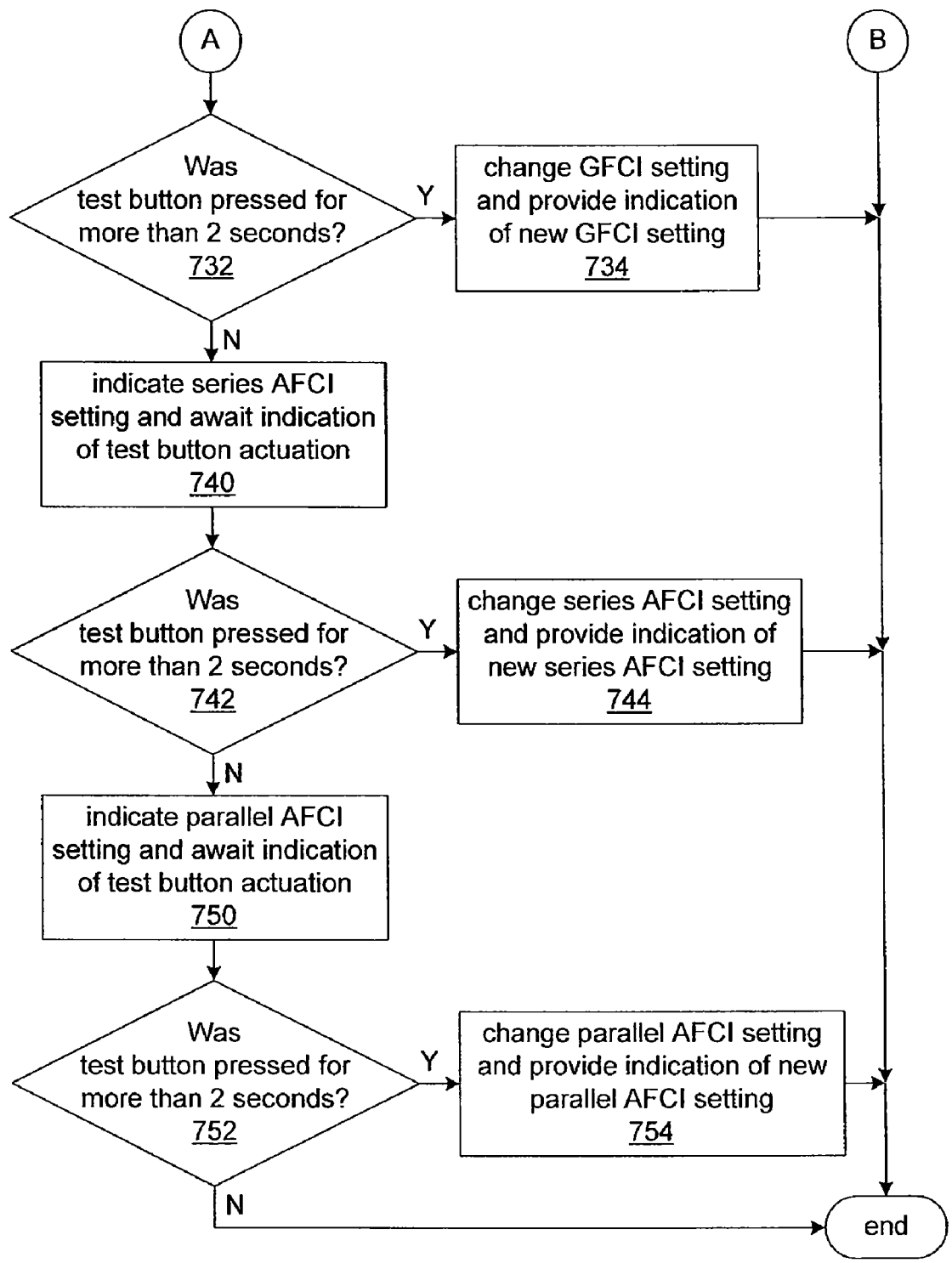

FIGS. 3a and 3b, together, show an exemplary procedure for directly configuring the settings of a circuit interrupter. At 710 of FIG. 3a, an indication that a test button was actuated is received. If, at 712, the test button was pressed for more than 2 seconds, then a test of the trip mechanism of the circuit interrupter is performed at 714.

However, if at 712, the test button was not pressed for more than 2 seconds, then a setting of the circuit breaker function of the circuit interrupter (such as a setting of either the short time delay or long time delay) is indicated, and another actuation of the test button is awaited at 720. If, at 722, the test button was pressed for more than 2 seconds, then a circuit breaker setting is changed and the new setting is indicated at 724.

However, if at 722, the test button was not pressed for more than 2 seconds, then a setting of the GFCI function of the circuit interrupter (such as a setting of a choice in ground fault protection between a human protection mode and an equipment protection mode) is indicated, and another actuation of the test button is awaited at 730. If, at 732 of FIG. 3b, the test button was pressed for more than 2 seconds, then a GFCI setting is changed and the new setting is indicated at 734.

However, if at 732, the test button was not pressed for more than 2 seconds, then a setting of the series AFCI function of the circuit interrupter (such as a setting enabling or disabling series arc fault protection) is indicated, and another actuation of the test button is awaited at 740. If, at 742, the test button was pressed for more than 2 seconds, then a series AFCI setting is changed and the new setting is indicated at 744.

However, if at 742, the test button was not pressed for more than 2 seconds, then a setting of the parallel AFCI function of the circuit interrupter (such as a setting enabling or disabling parallel arc fault protection) is indicated, and another actuation of the test button is awaited at 750. If, at 752, the test button was pressed for more than 2 seconds, then a parallel AFCI setting is changed and the new setting is indicated at 754. Otherwise, if at 752, the test button was not pressed for more than 2 seconds, then the configuration mode is simply exited without taking any further action regarding configuration.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A method of protecting a power circuit with a circuit interrupter having separable contacts, an operating mechanism structured to open and close the separable contacts, a trip mechanism cooperating with the operating mechanism to trip open the separable contacts, a test button to test the trip mechanism, an indicator, and an arc fault detector or a ground fault detector, said method comprising:
   awaiting an actuation of the test button;
   testing the trip mechanism in response to the duration of the actuation of the test button being within a first preselected range of time duration; and
   selecting a protection mode and operating the indicator to indicate the selection of the protection mode in response to the duration of the actuation of the test button being within a different second preselected range of time duration.

2. The method of claim 1, said method further comprising storing the selection of the protection mode in a nonvolatile memory in response to the duration of the actuation of the test button being within the second preselected range of time duration.

3. A ground fault circuit interrupter comprising:
   separable contacts;
   an operating mechanism structured to open and close the separable contacts;
   a trip mechanism cooperating with the operating mechanism to trip open the separable contacts;
   a test button operable to test the trip mechanism;
   an indicator;
   a controller structured to configure a setting of the ground fault circuit interrupter and to operate the indicator to indicate the setting in response to receiving an indication of an actuation of the test button; and
   wherein the setting is a selection between a personnel protection mode and an equipment protection mode, and wherein the controller is further structured to configure the selling and to operate the indicator to indicate the setting in response to receiving the indication of the actuation of the test button.

4. A method of protecting a power circuit with a circuit interrupter having separable contacts, an operating mechanism structured to open and close the separable contacts, a trip mechanism cooperating with the operating mechanism to trip open the separable contacts, a test button to test the trip mechanism, an indicator, and an arc fault detector or a ground fault detector, said method comprising:
  awaiting an actuation of the test button;
  testing the trip mechanism in response to the duration of the actuation of the test button being within a first preselected range of time duration;
  configuring a setting of the circuit interrupter and operating the indicator to indicate the setting in response to the duration of the actuation of the test button being within a different second preselected range of time duration; and
  selecting between a human protection mode and an equipment protection mode during the configuring.

* * * * *